United States Patent [19]
Maruo et al.

[11] Patent Number: 5,959,655
[45] Date of Patent: Sep. 28, 1999

[54] LIGHT BEAM SCANNING APPARATUS WHICH CONTROLS POWER AND SPOT SHAPE OF LIGHT BEAM

[75] Inventors: Seiji Maruo, Hitachi; Shinichi Nakatsuka, Hino; Akira Arimoto, Kodaira; Kunio Sato, Hitachi; Shinya Kobayashi; Susumu Saito, both of Mito, all of Japan

[73] Assignees: Hitachi, Ltd.; Hitachi Koki Co., Ltd., both of Tokyo, Japan

[21] Appl. No.: 08/653,395

[22] Filed: May 24, 1996

[30] Foreign Application Priority Data

May 30, 1995 [JP] Japan ............................. 7-131446
Oct. 6, 1995 [JP] Japan ............................. 7-259743

[51] Int. Cl.⁶ .................................................. G01J 1/32
[52] U.S. Cl. ......................... 347/246; 347/236; 347/247; 250/205
[58] Field of Search ............................. 347/246, 236, 347/247; 250/205

[56] References Cited

U.S. PATENT DOCUMENTS 5,130,524  7/1992  Egawa et al. ............................ 347/246
5,146,240  9/1992  Hayashi et al. ......................... 347/246

FOREIGN PATENT DOCUMENTS 62-24771  2/1987  Japan .
3-196023  8/1991  Japan .
6-97580   4/1994  Japan .

*Primary Examiner*—N. Le
*Assistant Examiner*—Hai C. Pham
*Attorney, Agent, or Firm*—Antonelli, Terry, Stout & Kraus, LLP

[57] ABSTRACT

A light beam scanning apparatus in which laser power and spot shape of an emitted laser beam are controlled, has a laser control signal generating part for changing a picture signal to a laser power control signal and a spot shape control signal, a laser power control current generating part which is driven by the laser power control signal, a spot shape control current generating part which is driven by the shape control signal, and a laser beam emission part for emitting a laser beam having a laser power and a spot shape which are controlled by the control signals via a commonly used light wave guiding part, wherein the control signal generating part generates or corrects the control signals based on at least one of the difference between the laser power of a beam to be emitted and a detected laser power, the difference between the spot shape of a beam to be emitted and a detected laser power, a detected temperature at the laser beam emission part, and an effective light emission pixel number.

7 Claims, 10 Drawing Sheets

LIGHT BEAM SCANNING APPARATUS WHICH CONTROLS POWER AND SPOT SHAPE OF LIGHT BEAM

BACKGROUND OF THE INVENTION

The present invention relates to a picture printing apparatus, especially to a laser beam printer for writing-in information using laser beam scanning.

A standard laser beam printing apparatus, which prints information, including characters and pictures, writes information represented by a pixel matrix using a laser beam scanning method. And, usually, a laser beam scans a photoconductor with a predetermined beam spot size for a predetermined pixel density to be printed.

On the other hand, printed pixel density changing or neutral grade picture printing is required corresponding to the diversification of information to be represented or the need for high-definition picture printing.

Therefore, it is desirable to be able to change a beam spot size in a laser beam scanning system to a required size. As a method of changing a spot size, there is a well known method of changing a printed spot size by changing the power of the laser beam. However, since the beam spot size itself is not changed, but only the power exposed on a photoconductor by the laser beam in accordance with this method, the gradation representation in a fine part of a picture makes it difficult to display a high-resolution picture.

Further, in JP-A-196023/1991, there is disclosed a method of changing a pixel size printed on a scanning plane by using a combination of adjusting the exposure time and using a light element, provided in a beam path, for changing the beam spot size in a specified direction. And, a method of obtaining a desired beam spot size by using a liquid crystal shutter in a beam path is disclosed in JP-A24771/1987.

However, those methods have problems, such as the necessity of providing a specific light element for modulating the beam spot size and the large size of the resulting light system, laser power losses, low speed in the spot size modulation, etc. In order to solve the above-mentioned problems, a semiconductor laser element in which the beam spot size and the laser power are separately controlled has been proposed in JPA-97580/1994.

The newly devised semiconductor laser element, while solving some problems, also has the following problem, that is, since a light wave guide part is commonly used in the element, the two kinds of controls for the beam spot size and the laser power interrelate with each other in a non-linear manner, which prevents a high-resolution picture display from being obtained.

SUMMARY OF THE INVENTION

An objective of the present invention is to provide a effective and practical method of use of the above-mentioned semiconductor laser element and a light beam scanning apparatus using the method.

The objective of the present invention is attained by providing a light beam scanning apparatus having the following features.

The apparatus having the first feature, comprises:

beam emission means for emitting a laser beam, the spot shape (also referred to a spot size) and the laser power of the laser beam being controlled via a commonly used light wave guide part;

beam control means for controlling the beam emission means in accordance with a picture signal containing information on a spot shape and a laser power of the laser beam to be emitted;

beam scanning means for scanning a photo-conductor with the laser beam and recording the information of the picture signal; and laser power detecting means for sensing the laser power of the laser beam emitted from the beam emission means;

wherein the beam control means includes laser power correcting means for correcting the control of the laser power of the laser beam emitted from the beam emission means, based on a difference between laser power data designated by the picture signal and a laser power detected by the laser power detecting means.

Further, it is possible to replace the laser power detecting means with laser power and spot shape detecting means, and also to replace the laser power correcting means with laser power and spot shape correcting means for correcting the control of the laser power and spot shape of the laser beam emitted from the beam emission means, based on the difference between laser power data designated by the picture signal and a detected laser power, and the difference between spot shape data designated by the picture signal and a detected spot shape.

Further, the above apparatus further includes effective light emitting pixel number counting means for estimating the effective light emitting pixel number, based on the difference between the number of actual light-emitted pixels and the number of successive non-emitted pixels, and temperature detecting means for sensing a temperature of a laser emission part of the beam emission means, wherein the laser power and spot shape correcting means corrects the control of the laser power and spot shape of the laser beam emitted from the beam emission means by using at least one of the laser power and spot shape detecting means, the effective light emitting pixel number counting means, and the temperature detecting means.

Furthermore, an apparatus having another feature, comprises:

beam emission means for emitting a laser beam, the spot shape and the laser power of the laser beam being controlled via a commonly used light wave guide part;

beam control means for controlling the beam emission means in accordance with a picture signal containing information on the spot shape and the laser power of the laser beam to be emitted; and beam scanning means for scanning a photo-conductor with the laser beam and recording the information of the picture signal;

wherein the beam control means includes data storing means for storing a data set representing relations between picture signals, and pairs of values, each pair including a laser power control signal value and a spot shape control signal value, the relations being prepared on the basis of operational characteristics peculiar to the laser element being used, the beam control means further including laser power and shape control signal generating means for changing each of the picture signals to a laser power control signal and a spot shape control signal, based on the data set in the data storing means, and the information on spot size and laser power of the beam to be emitted, which is contained in the picture signal, so that the laser power and the spot shape of the beam emitted from the beam emission means are controlled by the laser power control signal and the spot shape control signal.

Although the above-mentioned spot shape modulating laser element, in which the spot size and the laser power of the emitted beam are changeable, is apt easily to be influenced by the effects of environmental condition changes and returned reflections, and further is apt to undergo a change to its operational characteristics with use, appropriate control of the laser element is secured by correcting control of the spot size and control of the laser power with the apparatus having the above-mentioned composition of the present invention, which can realize a light beam scanning apparatus presenting a high-quality picture.

DETAILED DESCRIPTION OF THE EMBODIMENTS

Figure 1:
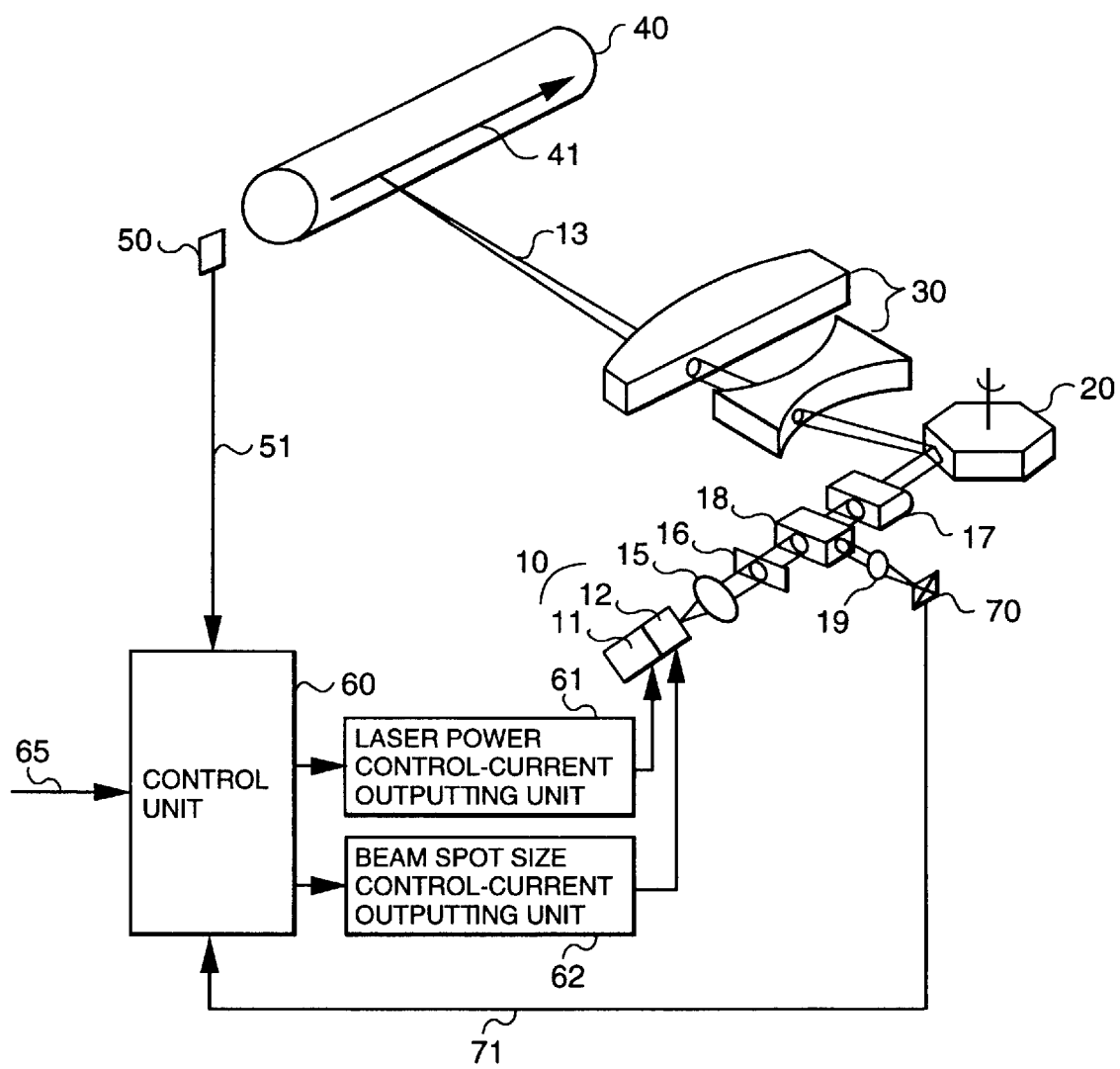
FIG. 1 is a diagrammatic view which shows a composition of a light beam scanning apparatus forming an embodiment of the present invention.

Hereinafter, details of the present invention will be explained with reference to various embodiments shown in the drawings.

Figure 2:
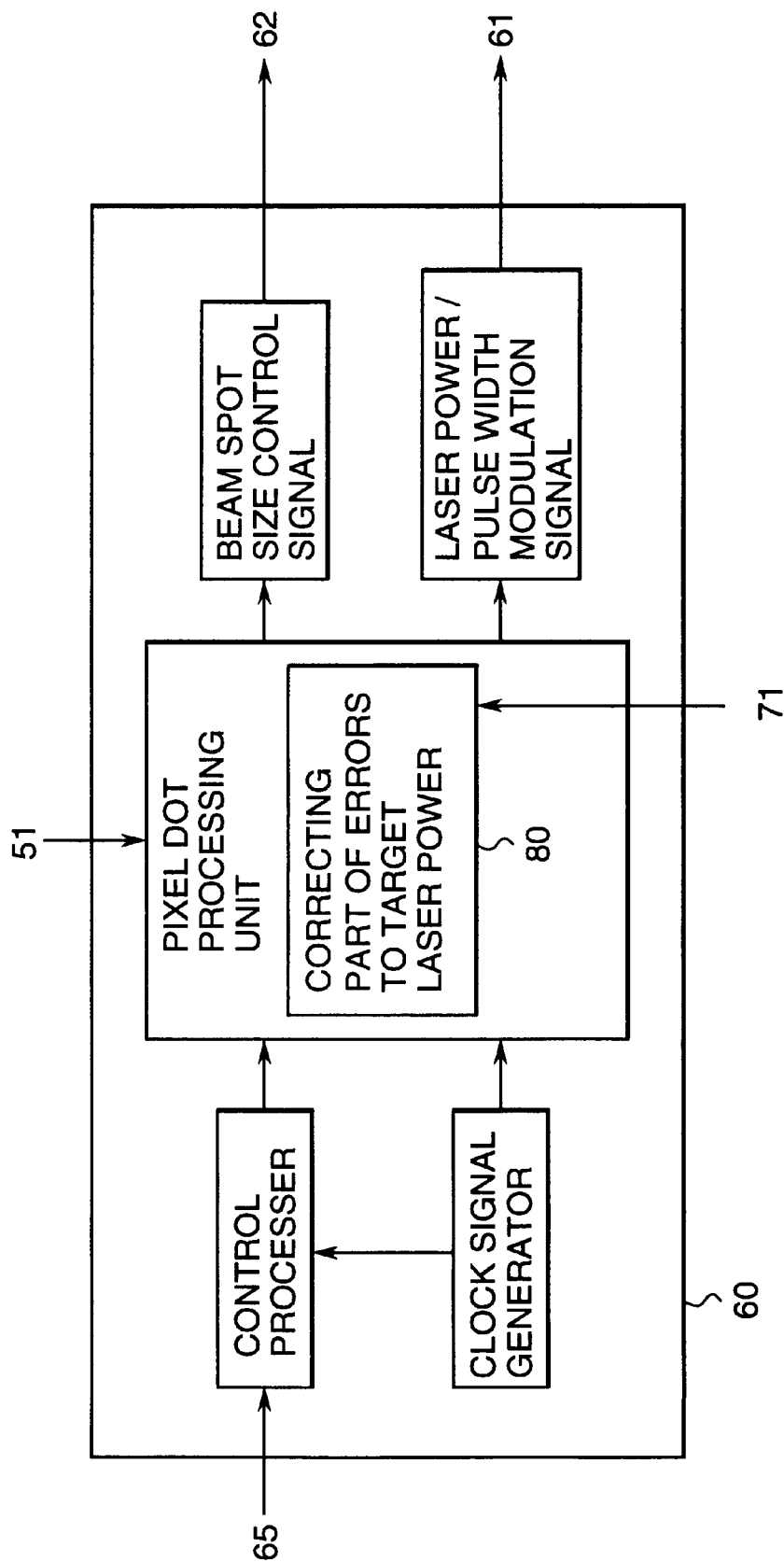
FIG. 2 is a block diagram which shows an example of an internal composition of a control part shown in FIG. 1.

FIG. 1 shows a light beam scanning apparatus forming an embodiment of the invention, and FIG. 2 shows an example of the internal composition of the control unit shown in FIG. 1.

Before explaining the composition and operations of the embodiment, first, a structure of a beam spot size modulating laser element and the principal operations of a laser power and spot size sensor will be explained in the following.

Figure 13:
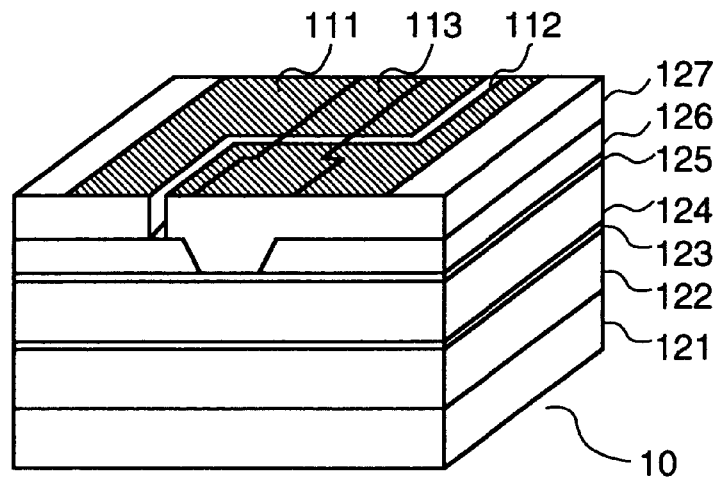
FIG. 13 is a perspective view of a beam spot size modulating laser element.

FIG. 13 is a view showing the structure of a beam spot size modulating laser element. This beam spot size modulating laser element 10 is a semiconductor laser element of the type described in JP-A-97580/1994, in which both the laser power and the spot size can be controlled and changed via a commonly used light wave guide. The beam spot size modulating laser element 10 has what is called a gain guiding structure composed of a n-GaAs substrate 121 earthed in a packaging process, a n-$Al_{0.5}Gao_5$As cladding layer 122, a multiple quantum well activation layer 123 operating as a light wave guiding part commonly used for emitting a laser beam of which the laser power and the spot shape are respectively controlled, a p-$Al_{0.5}Gao_5$As cladding layer 124, a p-GaAs capping layer 125, a n-GaAs blocking layer 126 for regulating injected current and a p-GaAS contacting layer 127. The laser power and the spot shape, especially the laser power, is adjusted by changing the refractive index of the common light wave guiding part 123.

In a laser emission unit using the beam spot size modulating laser element 10 having the above-mentioned structure, the laser power and the spot size are controlled by the following method.

At first, the response characteristics of a shortsighted view of a spot size in a modulating direction and the laser power corresponding to an injected control current for controlling the beam spot size, will be explained in the following. Ideally, it is desirable for changes in the control current for controlling the beam spot size to not affect the laser power, but only affect the spot size (the spot size exposed on a photo-conductor 40 as shown in FIG. 1). However, the spot size and the laser power actually are interdependent and change together. Further, the spot size changes in a nonlinear manner in response to changes in the control current for controlling the beam spot size, as already mentioned.

The reason for the non-linearity in changes in the response characteristics is that, in the beam spot size modulating laser element 10, which is used as the spot size changing means, a current injected from a beam spot control electrode 112 changes the distribution of refractive index in the light wave guiding part 123 of the beam spot size modulating laser element 10. And, the changes in the refractive index distribution affect the optical mixing ratio, which causes changes in the laser power due to changes in the spot size and changes in the characteristics of the laser element responding to the changes of the injected control current.

The above-mentioned changes in the response characteristics of the laser occur even when the beam spot diameter modulating laser element 10 is operated under ideal conditions. Therefore, it is desirable to control the laser element 10 by feeding back the changes in the response characteristics of the laser element, including the non-linear characteristics caused by changes in environmental conditions, such as temperature changes, effects of returned reflections, etc.

Figure 14:
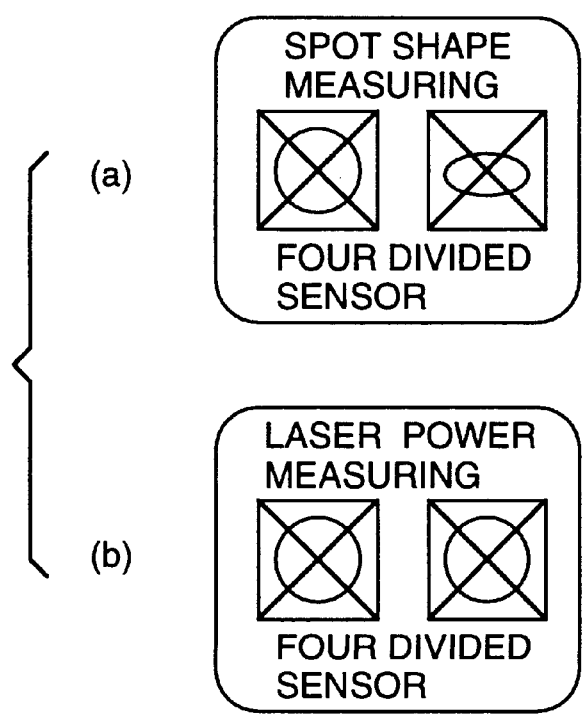
FIG. 14 shows diagrams for explaining principal operations of a laser power and spot size sensing element.

FIG. 14 provides diagrams for explaining principal operations of a laser power and spot size sensing element.

In the embodiment, a four area divided sensor 70, as shown in FIG. 1, is used as a laser power and spot size sensor. And, the four area divided sensor is capable of detecting simultaneously the laser power and spot size of a laser beam, and is of the type which has been used for general purposes, for example, for control in an optical disc system. As shown in FIG. 14, the four area divided sensor detects laser power based on the total laser power obtained by summing the four amounts of the laser power detected by the four sub-areas of the sensor, as seen in FIG. 14(b), and the spot size is obtained from the ratio of two values of laser power, each value being obtained by summing the two amounts of laser power detected by pairs of sub-areas arranged opposite each other in the four area divided sensor, as shown in FIG. 14(a). The detailed operations of the four area divided sensor are omitted from this description because they are generally known.

The composition and the operations of an embodiment of the present invention will be explained in the following, referring to FIGS. 1, 2, 13 and 14, the embodiment representing an ideal method for control of the laser power and spot size of a laser beam.

The light beam scanning apparatus shown in FIG. 1 is composed of a beam spot size modulating laser element 10, which is used as a laser beam emission means, a control unit 60 for controlling the laser element 10, based on a picture signal 65 containing information including the laser power and the spot size of the laser beam to be emitted. The control unit 60 is connected to a sensor for line synchronizing 50, a laser power control-current outputting unit 61 and a beam spot size control-current outputting unit 62. The apparatus further has light beam scanning means for scanning a photoconductor 40 with a laser beam 13, which includes a collimating lens 15, a cylindrical lens 17, a polygon mirror 20 and a Fe lens 30. A laser power and spot size sensor 70 is used as laser power detecting means for sensing the laser power of the emitted laser beam 13. The sensor 70 is associated with a laser power adjusting filter 16, a beam splitter 18 and a condensing lens 19. Finally, as will be explained later, the control unit 60 includes a correcting part 80 for correction of errors in a target laser power, as shown in FIG. 2, which generates control signals to be supplied to the laser beam emission means, so as to correct any errors between the detected laser power and the laser power required by the picture signal 65, in the emitted laser beam.

In the beam spot size modulating laser element 10, like the standard semiconductor laser element, the laser power of the laser beam is controlled by changing the injected current input to a laser power control part 11 via an electrode 111 (FIG. 13) for controlling the laser power.

And, the spot size of the laser beam is controlled by changing the injected current input to a beam spot size control part 12 via a electrode 112 (FIG. 13) for controlling the spot size. Therefore, a pixel having a spot size and an intensity as required by the picture signal 65 is recorded by controlling the injected currents.

A laser beam emitted from the beam spot size modulating laser element, the laser power and spot size of which are controlled in accordance with the picture signal 65, passes the collimating lens 15, etc., and strikes the polygon mirror 20 of the beam path changing means. Then, the beam is reflected and its path is changed, by rotating the polygon mirror 20. The cylindrical lens 17 is used for converging the laser beam 13 to a line, perpendicular to the axis of rotation, on a plane of the polygon mirror 20, in order to correct the parallel aberration caused by the polygon mirror 20.

Further, the laser beam 13 is converged on a surface of the photo-conductor 40 by the Fe lens 30 in the beam scanning lens system, and a beam scanning line 41 at a predetermined line position on the surface of the photoconductor 40 is scanned at a uniform speed with the laser beam 13. Successive lines are scanned as the photo-conductor 40 rotates in the direction perpendicular to the scanning direction at a uniform speed. The sensor 50, which may be a photo-sensor provides for line synchronizing by detecting the start point in the scanning line of the scanning beam, and a signal 51 indicating the start point is sent to the control unit 60 as a line synchronizing signal from the sensor 50.

The control unit 60 generates a laser power pulse width modulation signal and a beam spot size control signal in accordance with the information indicating laser power and spot size included in the picture signal 65, and these control signals are sent to the laser power control-current outputting unit 61 and the beam spot size control-current outputting unit 62, respectively. Then, laser power control (or a laser exposing time control) and spot shape control (control of the beam spot size) are executed.

However, since the laser power is affected and changed by changes in the beam spot size, the deviations of the laser power from its target values are corrected by executing a feedback control in which the laser power and beam spot size sensor 70 is used. The correction is carried out by using the correcting part 80 for correction of errors to a target laser power, as shown in FIG. 2.

In explaining the operations of the correcting part 80 more in detail, the correcting part 80 obtains a signal 71 representing the errors in the laser power and the spot size of the laser beam emitted from the beam size modulating laser element 10, which is sent from the laser power and spot size sensor 70, and a representation of the laser power as a target indicated by the laser power pulse width modulation signal which is output to the laser power control-current outputting unit 61. Then, the control unit 60 corrects (by executing feedback control) the control signals to be sent so that the laser power of the emitted laser beam 13 converges on the laser power as a target. Thus, the laser power pulse width modulation signal is adequately corrected.

Now, it is known that the amount of change in laser power caused by a change in spot size is larger than the amount of change in spot size caused by a change of laser power. Therefore, it is possible for the laser power to be appropriately controlled, almost without affecting the spot size, by only adjusting the laser power. However, it is naturally desirable to correct both the laser power and the spot size. In correction method according to the invention, the laser power and spot size sensor 70 is not used for detecting only the laser power, but is used to detect both laser power and spot size, and so the correcting part 80 for correction of errors in target laser power is implemented by correcting means for correcting errors in both the target laser power and the target spot size.

As seen in a standard laser beam printer, the writing-in of a picture is carried out by a combination of high-speed repeated scanning operations with the laser beam and comparatively low-speed motion of a photo-conductor in the direction perpendicular to the scanning direction. Therefore, the spot size in the direction parallel to the scanning direction of a recorded pixel spot can be controlled by laser pulse width modulation.

In another beam spot size controlling method, the spot size in the direction perpendicular to the scanning direction can be continuously changed by arranging a junction face of the multiple quantum well activation layer 123 in the beam size modulating laser element 10 perpendicular to the scanning direction and by changing the current injected into the beam spot size control part 12 in accordance with the picture signal. Thus, the spot size in the direction perpendicular to the scanning direction of a recorded pixel spot can be changed continuously or in a multi-valued signalization manner. As mentioned above, since the size of a recorded pixel spot can be changed in the scanning direction and the direction perpendicular thereto at a high speed, the required spot shape of a recorded pixel spot can be realized for each pixel. In the above-explained method, the beam size control and the laser pulse width modulation control which is employed to change the spot shape of a recorded pixel spot can be changed, and the method is also available for beam size control and laser power control.

The above-mentioned control method is an ideal method of controlling the laser power and the spot size, respectively, in the light beam scanning apparatus of the present invention.

On the other hand, in a high-speed laser printer, sometimes, the pixel printing clock cycles exceed 50 MHz, and real time correction using the above-mentioned feedback method is not practical. Therefore, the following embodiment is preferable for such high-speed laser printing. In the following, a practically useful method of controlling beam spot size and laser power will be explained.

Figure 3:
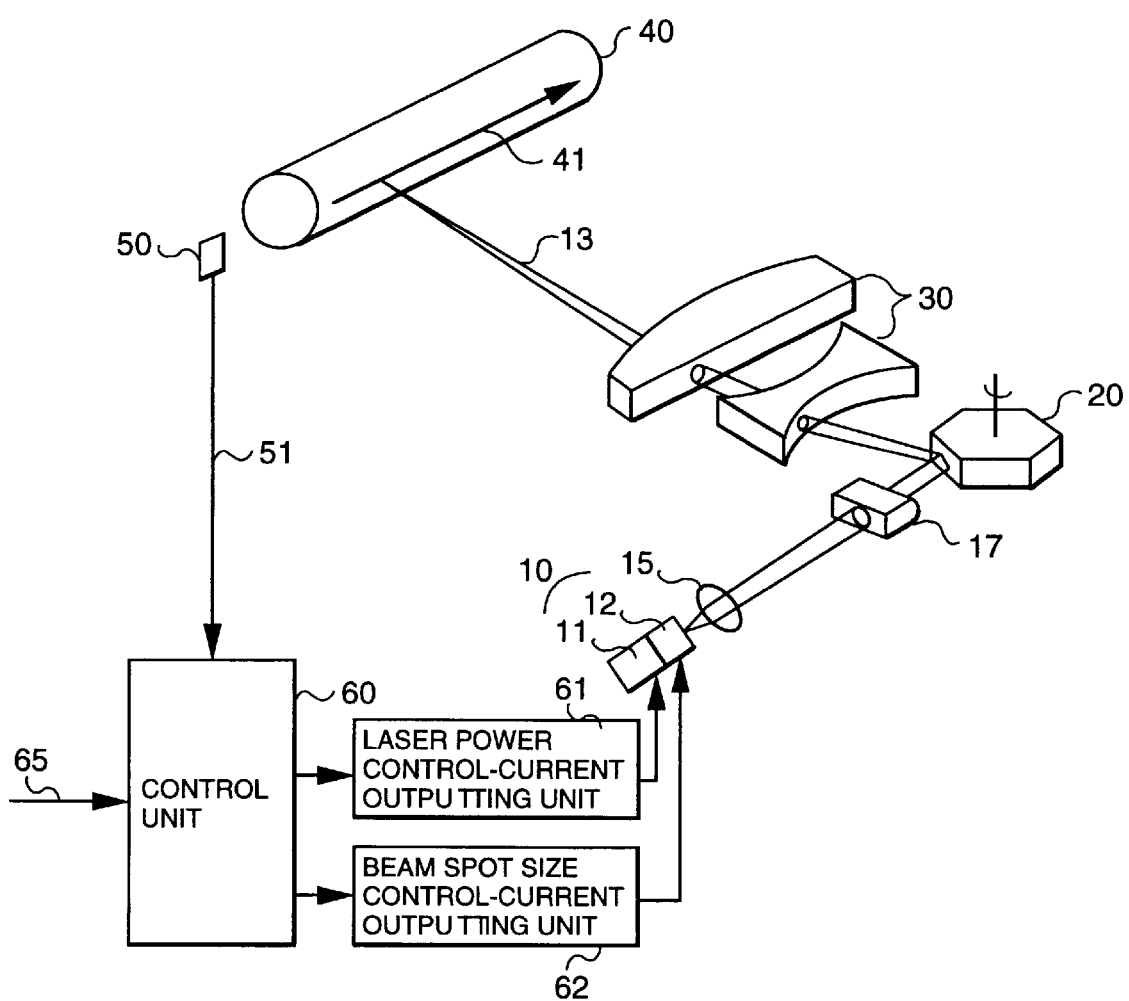
FIG. 3 is a diagrammatic view which shows a composition of a light beam scanning apparatus according to another embodiment.

FIG. 3 shows the composition of a light beam scanning apparatus which forms another embodiment in the present invention. The embodiment shown in FIG. 3 has the same composition as the embodiment shown in FIG. 1 except that this embodiment shown in FIG. 3 does not have the laser power and spot size sensor 70 and the parts related to the sensor 70, that is, the laser power adjusting filter 16, the beam splitter 18 and the condensing lens 19. And, this embodiment generally is available for use in a case in which the above-mentioned real time feedback control can not be applied.

Figure 4:
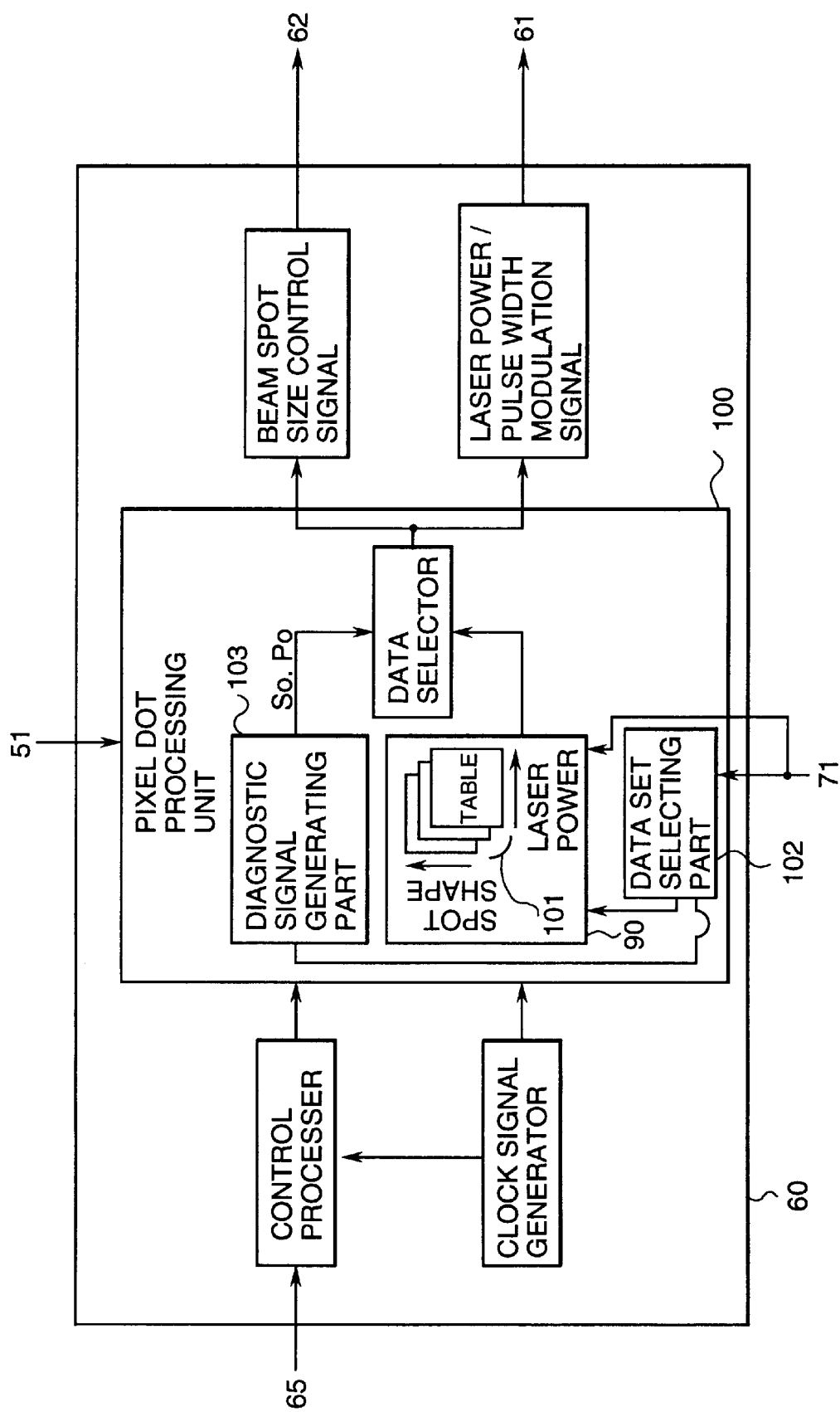
FIG. 4 is a block diagram which shows an example of an internal composition of a control part shown in FIG. 3.
Figure 5:
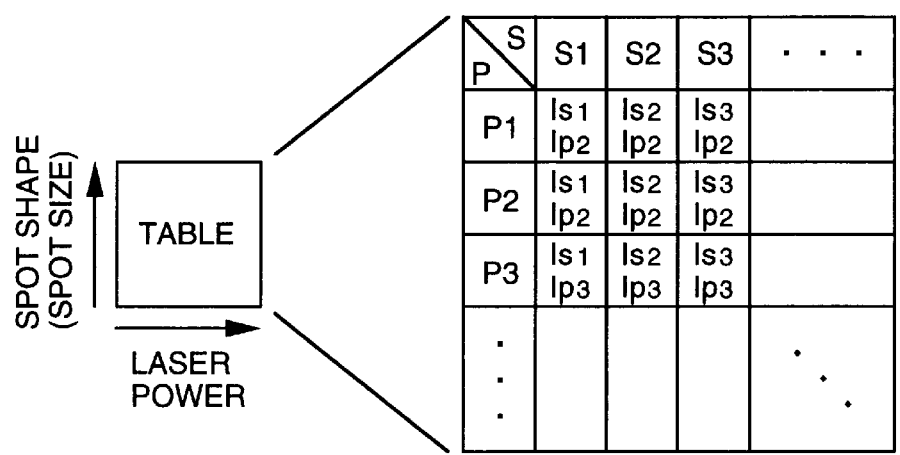
FIG. 5 is a diagram which shows an example of a relation table shown in FIG. 4.

A feature of this embodiment is that a table of values representing relations between pairs values representing of a required laser power and a required spot size, i.e. pairs of values representing a laser power control current Ip and a spot size control size Is, are provided in the control part 60, as shown in FIGS. 4 and 5. That is, since it is difficult to feedback changes in operational characteristics of the beam size produced by the modulating laser element 10 in real time, relational data sets representing relations between the picture signals, and pairs of values representing a laser power control signal and a spot size control signal to be input to the laser element 10 are prepared in advanced, based on the operational characteristics peculiar to the laser element being used.

FIG. 4 shows the internal composition of the control unit 60 shown in FIG. 3, and FIG. 5 shows an example of a table of values representing the relations between the picture signals in the form of pairs of values representing a laser power control signal and a spot size control signal.

That is, the control unit 60 stores the prepared relational data sets representing relations between the picture signals, forming pairs of values representing a laser power control signal and a spot size control signal to be input to the laser element, in order to change the received picture signal to a laser power control signal and a spot size control signal. The relational data sets are stored, for example, in a table form as shown in FIG. 5.

The control unit 60 generates the laser power pulse width modulation signal and the spot size control signal in accordance with the received picture signal, and sends the control signals to the laser power control-current outputting unit 61 and the spot size control-current outputting unit 62.

On the other hand, in this embodiment, a unit 100 for changing the picture signal to laser control signals, uses each of the pairs of the laser power data P (P1, P2, P3, . . . ) and the spot size data S (S1, S2, S3, . . . ), which are specified by the sent picture signal 65, to access a corresponding one of pairs of a laser power control signal value Ip (Ip1, Ip2, Ip3, . . . ) and a spot size control signal value (Is1, Is2, Is3, . . . ), in a table stored in the data storing unit 90. Then, the obtained pair of control signal values are sent to the laser power control-current outputting unit 61 and the spot size control-current outputting unit 62, respectively, to which control the laser power and the spot size of a laser beam to be emitted from the laser element 10.

Thus, in this embodiment, since the relational data sets used for changing the picture signal to laser control signals are based on the assumed and estimated changes in the non-linear operational characteristics of the laser element 10, which are caused by changes in environmental conditions, such as temperature, the returned reflections, etc., the laser power and the spot shape of the emitted laser beam can be more accurately controlled in comparison with the laser power and spot shape controlled by an apparatus which ignores the changes in the nonlinear operational characteristics of the laser element being used. Thus, this embodiment can provide means for accurately controlling the laser power and the spot size of a laser beam emitted from the beam size modulating laser element.

Although the above-mentioned embodiment is sufficiently useful for a comparatively small range of change in the operational characteristics of the laser element being used, the following method is more desirable when a large range of change in the characteristics is assumed. That is, a plurality of tables representing the above-mentioned relational data sets used for generating the laser control signals are provided for an assumed operational condition range, and one of the plurality of tables is selected, corresponding to an estimated operation point in the assumed operational condition range of the laser element being used.

Such a method is realized by an embodiment shown in FIG. 4. The pixel dot processing unit 100 includes a diagnostic signal generating part 103 for generating a laser power diagnosis signal Po and a spot size diagnosis signal So, which signals drive the laser power control-current outputting unit 61 and the spot size control-current outputting unit 62 so that the beam spot size modulating laser element 10 emits a laser beam having a laser power and a spot size corresponding to the laser power diagnostic signal Po and the spot size diagnostic signal So. Then, the laser power and spot size signal 71 of the emitted laser beam is detected by a laser power and spot size sensor 70 (the same one as the sensor shown in FIG. 1). One of the tables 101 in the data storing part 90 is selected and used, based on a difference between the detected laser power and the laser power diagnosis signal Po and a difference between the detected spot size and the spot size diagnosis signal So. The pixel dot processing unit 100 for changing a picture signal to laser control signals changes the picture signal 65 to a laser power control signal and a spot size control signal using the selected table.

Furthermore, in this embodiment, a relational data set selecting part 102 also has the function of determining each grade of the difference in laser power and the difference in spot size. Of course, it is possible for the data storing part 90 to directly receive the laser power and spot size signal 71, and to determine a table to be used. Although, in the above-mentioned embodiments, the correcting part 80 for correction of errors in the target laser power, the relational data set selecting part 102 and the unit 100 for changing a picture signal to laser control signals are included in the control unit 60, it is possible to provide the correcting part 80, the relational data set selecting part 102 or the unit 100.

Further, in the embodiment shown FIGS. 3 and 4, since the diagnostic signal generating part 103 continues to generate the laser power diagnosis signal Po and the spot size diagnosis signal So for a predetermined period which is of sufficient length to be detected by the laser power and spot sensor 70, and the laser power and the spot size of the laser beam emitted based on the diagnostic signals are accurately measured by accumulating the beam energy which the sensor 70 receives during the predetermined period, the grades of the operational characteristic changes (the grades of the differences in laser power and spot size) can be estimated, even if the pixel printing clock cycles exceed 50 MHz.

Figure 6:
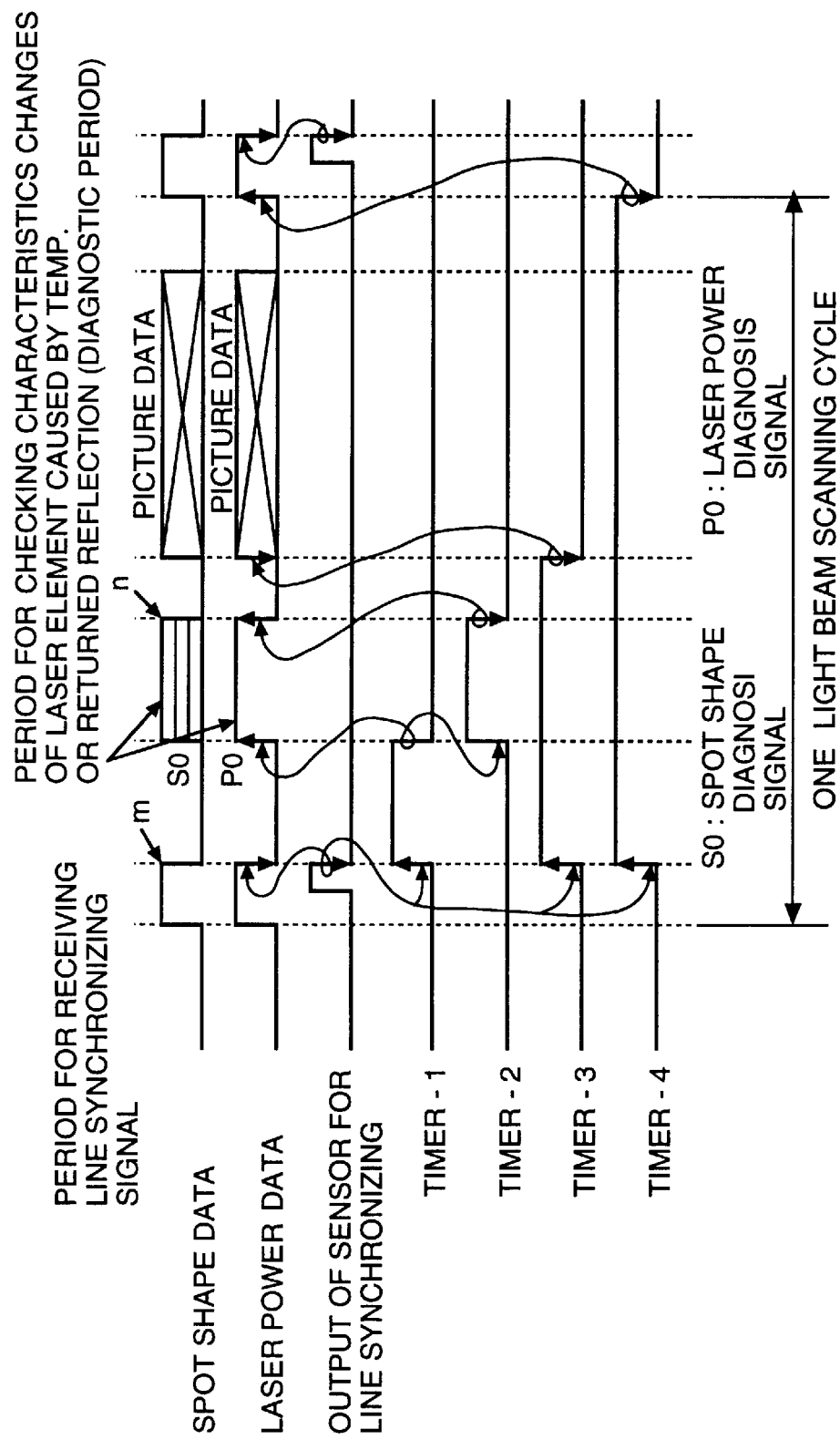
FIG. 6 is a timing diagram which shows an example of control sequence executed by the control part shown in FIG. 3.

FIG. 6 shows an example of a control sequence executed by the control unit 60 shown in FIG. 3. The outline of the control sequence is shown by fundamental timing charts. Generally, a line synchronizing signal 51 is used as the basis of synchronization timing. In the embodiment, the diagnostic period for checking changes in the characteristics of the semiconductor laser element is provided between the picture data portion of the picture signal and the line synchronizing signal 51. In the period, the laser power and spot size sensor 70 detects the laser power and the spot size of a laser beam corresponding to the picture signal, and the changes in characteristics of the laser element are judged, based on the differences between the detected signals and the diagnostic signals. And, based on the judgement, one of the prepared tables of the relational data sets used for changing a picture signal to laser control signals is selected.

Now, the form for expressing the relational data sets is not restricted to a table form, and any form capable of expressing a relational data base, for example, a function form, is also usable. Further, although, in the embodiment, a table is selected from a plurality of prepared tables, a method of rewriting the contents of a table as needed, based on the data detected by the laser power and spot size sensor 70, may be available. In this method, the beam spot size modulating laser element 10 should be driven by a plurality of control signals. For this purpose, a plurality of laser beams are detected by the sensor 70 and the detected data is processed.

Now, in the embodiment, the emitted laser beam is divided by the beam splitter 18, and one of the divided beams is condensed by the condensing lens 19. Then, the condensed beam is received by the laser power and spot size sensor 70, which is located adjacent the polygon mirror, on the side thereof nearer to the laser element.

The laser power and spot size sensor 70 can be located at any place, but placing the sensor in the neighborhood of the line synchronizing sensor 50 is not preferable, since it is difficult with such an arrangement to detect the high-speed scanning laser beam. Further, it is also difficult to detect a correct spot shape in some scanning detection.

In an existing apparatus, a laser power sensor is usually arranged in the same package in which a laser element is contained. And, in such an arrangement of the laser power sensor, it is difficult for the sensor to correctly monitor the emitted laser power of even a standard simple laser, so that the sensor typically is able to measure only data proportional to the emitted laser power. In the case of using a laser element having a structure of electrodes wherein the beam spot size at the beam emitting side is different from the beam spot size at an opposite side, as the structure of the laser element used in the embodiment, the above-mentioned difficulty becomes more significant, and placing the laser power sensor on the downstream side of the polygon mirror 20 makes it impossible for the sensor to receive enough power to function as a laser power sensor, which makes it very difficult to detect the power information concerning an emitted laser beam.

Therefore, it is desirable, from the view points of measurement accuracy of the sensor, simplicity in the structure of the light beam scanning apparatus, production cost and the size of the apparatus, for the laser power and spot size sensor 70 to be placed between the polygon mirror 20 and the laser element 10, in the neighborhood of the polygon mirror 20.

On the other hand, it is also possible for the laser power and spot size sensor 70 to be placed in the neighborhood of the line synchronizing sensor 50, since the laser power and spot size sensor 70 can be used as the line synchronizing sensor 50, and the spot size exposed on the photo-conductor 40 of the laser beam after passing the FΘ lens 30 can be estimated.

In the following, the possibility that the laser power and spot size sensor 70 can be used as the line synchronizing sensor 50 will be further explained. As mentioned before, the trailing edge m of the line synchronizing signal 51 shown in FIG. 6 is used as the basis for synchronization timing. However, the trailing edge n of the laser power diagnosis signal Po or the spot size diagnosis signal So also can be used as the basis for synchronization timing. Further, the leading edge of each diagnosis signal also can be used for this purpose.

If the laser power diagnostic signal or the spot size diagnostic signal is used for the basis of synchronization timing, and the laser power and spot size sensor 70 is used also as the line synchronizing sensor 50, then the light beam scanning apparatus is simplified and downsized, which results in its production cost being reduced.

Now then, it should be understood that the structure of the beam spot size modulating laser element is not restricted to the structure shown in FIG. 13, and any laser element having a structure capable of controlling the astigmatism in the element is available for use in accordance with the present invention.

Figure 7:
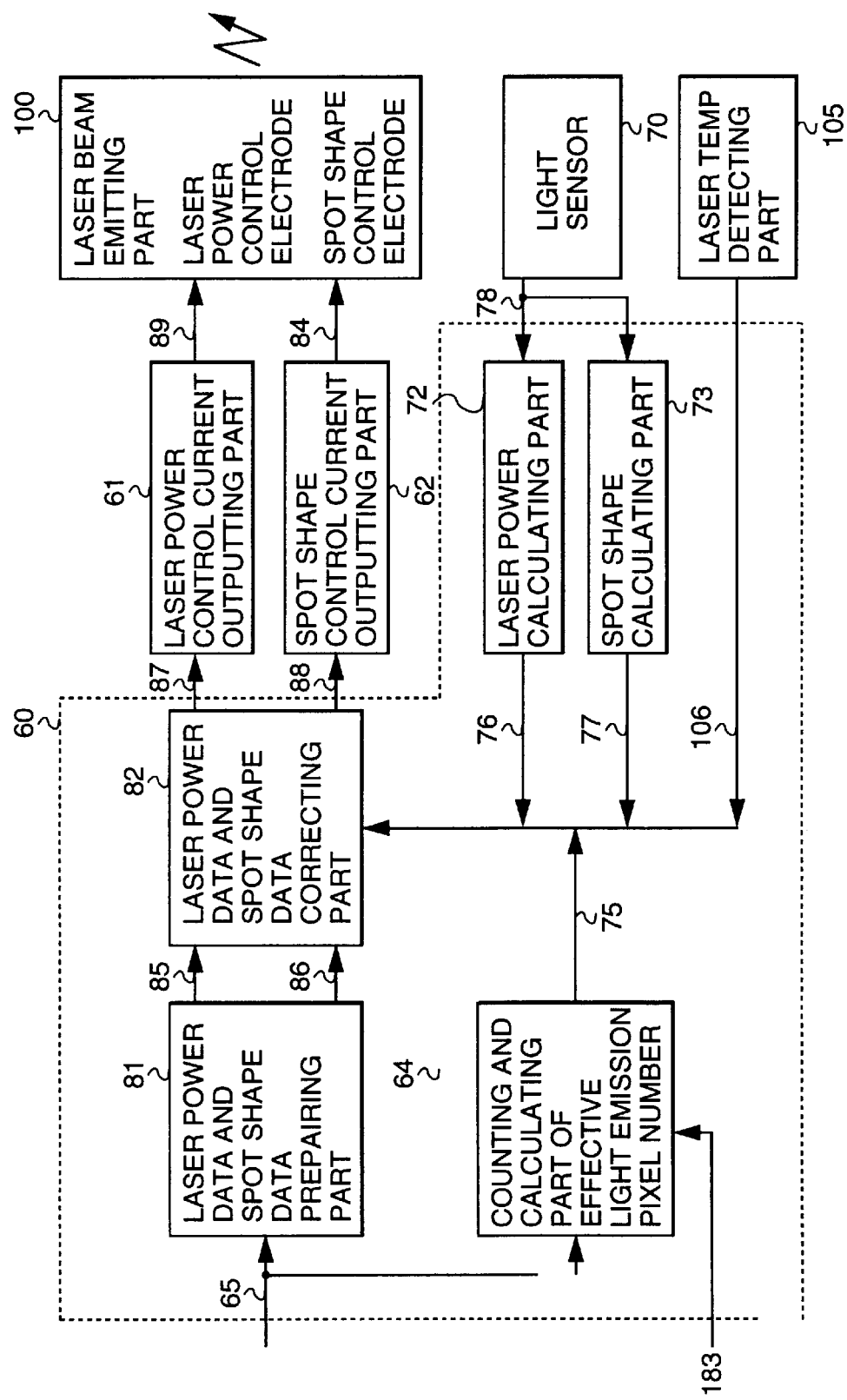
FIG. 7 is a block diagram which shows another example of an internal composition of a control part shown in FIG. 1.

FIG. 7 shows an example of the composition of a control unit 60, as shown in FIG. 1, which forms another embodiment of the invention. This control unit 60 is composed of a laser power and spot size data preparing part 81, a counting and calculating part 64 for calculating the effective light emission pixel number, a laser power calculating part 72, a spot size calculating part 73, and a laser power and spot size control data correcting part 82. The signals output from the laser power and spot size control data correcting part 82 are input to the laser power control-current outputting unit 61 and the spot size control-current outputting unit 62. In this embodiment, a laser temperature sensor 105 is provided, and its output is input to the laser power and spot size control data correcting part 82.

When the picture signal 65 is input to the control unit 60, the laser power and spot size data preparing part 81 executes a process of changing a picture signal to laser power control data and spot size control data, and the method of the data processing depends on the format of the received picture signal. For example, if the signal format of the picture signal is a binary format represented by 1 bit per one pixel, the laser power control data 85 is set to a preset value, and the spot size control data 86 is also set to a preset value, when the picture signal indicates the on-state. Otherwise, a null value is set to the control data 85 and 86. Now then, if the signal format of the picture signal is already provided in the formats used for the laser power control data and the spot size control data, the laser power and spot size data preparing part 81 does not execute the data processing. Then, the counting and calculating part 64 generates a calculated effective light emission pixel number signal 75 for estimating the light emission state of the laser element, e.g., the heat generating state. The laser power and spot size control data correcting part 82 corrects the laser power control data 85 and the spot size control data 86 which are sent from the laser power and spot size data preparing part 81, by using the calculated effective light emission number signal 75, a measured laser power value 76, a measured spot size value 77, a sensed laser temperature 106 and so forth, and generates a laser power control signal 87 and a spot size control signal 88. The laser power control-current outputting unit 61 generates a laser power control current 89 based on the laser power control signal 87, and the spot shape control-current outputting part 62 generates a spot size control current 84 based on the spot size control signal 88. The beam size modulating laser element 10 receives the laser power control current 89 and the spot size control current 84, and emits a laser beam of the required laser power and the required spot size for the picture signal. The laser power calculating part 72 supplies the measured laser power value 76, and the spot size calculating part 73 supplies the measured spot size value 77.

Figure 8:
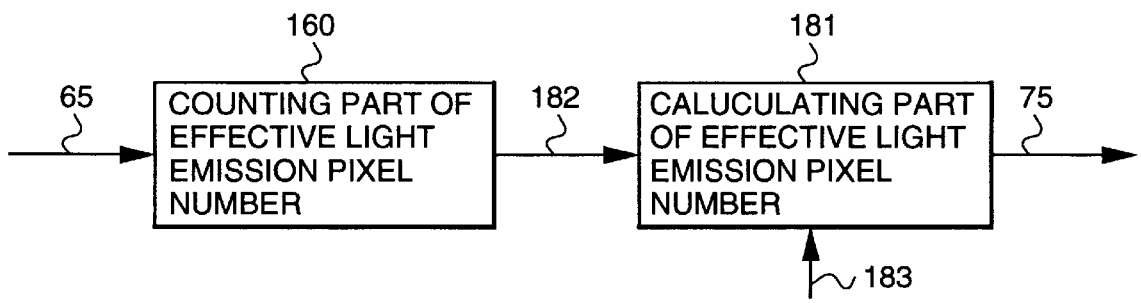
FIG. 8 is a block diagram which shows an example of an effective light emission pixel number counting and calculating part shown in FIG. 7.

In FIG. 8, the composition of the counting and calculating part 64 for calculating the effective light emission pixel number is shown.

In the figure, the counting and calculating part 64 is composed of a counting part 160 and a calculating part 181. The output 182 represents a raw effective light emission pixel number, and the signal 183 represents data used for setting a calculation formula into the calculating part 181.

When the picture signal 65 is input, the counting part 160 counts the number of pixels requiring light emission. If the signal format of the picture signal 65 is the binary format represented by 1 bit per one pixel, the counted number of black pixels is used for calculating the effective light emission pixel number, and if the signal format of the picture signal 65 is a multivalued format expressed by plural bits per one pixel, the effective light emission pixel number is calculated based on the pixel number weighted summation of the graded values of pixels, each pixel number being the number of the light emission pixels having the same power grade. The calculating part 181 calculates the effective light emission pixel number by using the data 182 output from the counting part 160 and outputs the calculated effective light emission pixel number signal 75. And, it is possible to set a calculation formula 183, to be used for calculating the effective light emission pixel number, into the calculating part 181 from the outside of the control unit 60. Since the counting and calculating part 64 can obtain the effective light emission pixel number equivalent to the pixel number weighted summation of the grade values of a light emission pixel, and since it is possible to set a calculation formula into the calculating part 181 from the outside, the effective light emission pixel number can be estimated for a multivalued picture signal in addition to a binary picture signal.

Figure 9:
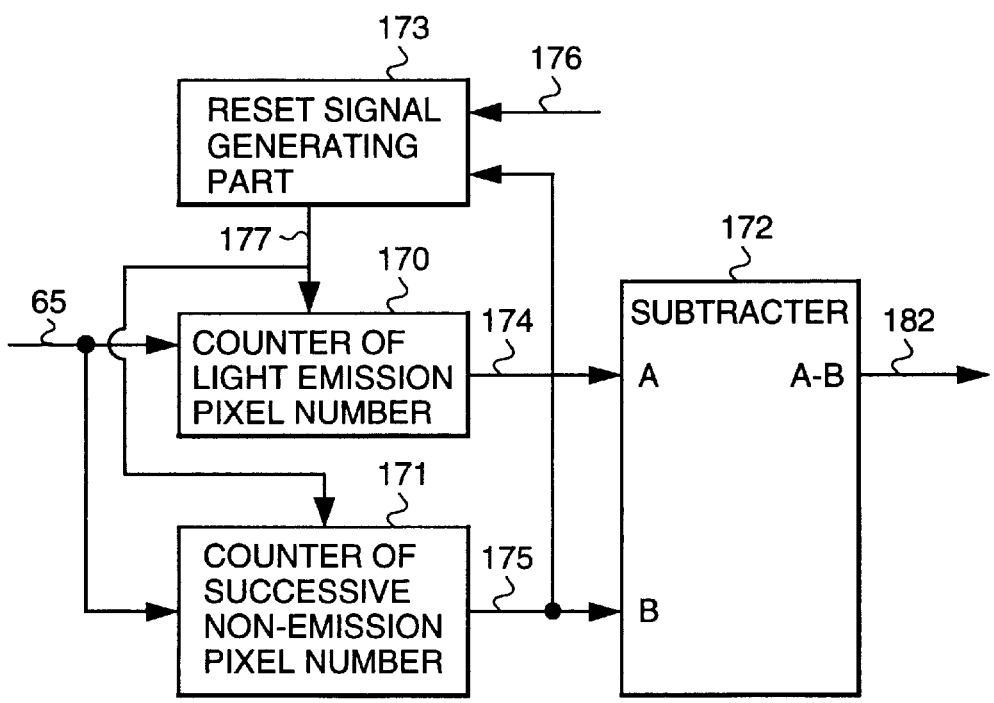
FIG. 9 is a block diagram which shows an internal composition of the effective light emission pixel number counting and calculating part shown in FIG. 7.

FIG. 9 shows an example of the composition of the counting part 160 of the counting and calculating part 64.

In the figure, the counting part 160 is composed of a counter 170 for counting the light emission pixel number, a detecting part 171 for detecting successive non-emission pixel numbers, a subtracter 172 and a reset signal generation part 173. The signals 174, 175, 176 and 177 represent the light emission pixel number, the non-emission pixel number, the preset reference number for resetting the counter 170 and the detecting part 171, and a reset signal, respectively.

When the picture signal is input, the counter 170 counts the light emission pixel number and outputs signal 174. And, the detecting part 171 detects successive non-emission pixel numbers and outputs signal 175. The subtracter 172 calculates the raw effective light emission pixel number by subtracting the successive non-emission pixel number 175 from the light emission pixel number 174, and outputs signal 182. Further, the reset signal generation part 173 compares the successive non-emission pixel numbers designated by signal 175 with the preset reference number indicated by signal 176 for resetting the counted pixel number, and outputs the reset signal 177 if the successive non-emission pixel number indicated by signal 175 exceeds the preset reference number indicated by signal 176 for resetting the counted pixel number. When the reset signal 177 is generated, the counter 170 and the detecting part 171 are reset, and the light emission pixel number signal 174 and the successive non-emission pixel number signal 175 are cleared. Since the above-mentioned counting part 160 detects not only the light emission pixel number, but also the successive non-emission pixel number, which are contained in the picture signal 65, it can generate the raw effective light emission pixel number signal 182, which is processed to provide the effective light emission pixel number signal 75, regarding the effects of heating and cooling in the laser element, contributing to the temperature increase of the laser element. Thus, by applying the present invention, it is possible to provide a light beam scanning apparatus which is capable of accurately correcting the effects of the temperature changes on operational characteristics of the laser element.

Figure 10:
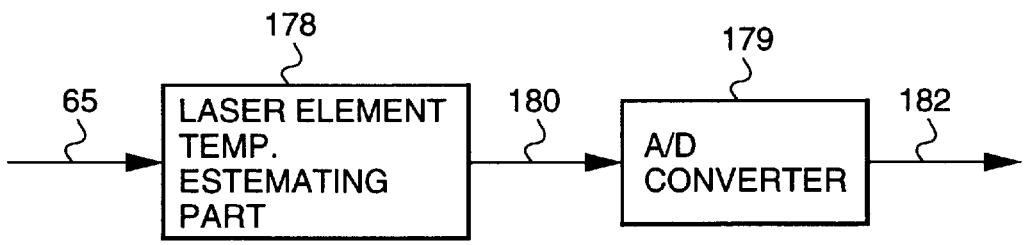
FIG. 10 is a block diagram which shows another example of a composition of the effective light emission pixel number counting and calculating part shown in FIG. 7.

Another composition of the counting part 160 is shown in FIG. 10. The composition of this counting part 160 is the same as the composition of the counting part 160 shown in FIG. 9 except that the raw effective light emission pixel number signal 182 is obtained by an analog circuit. In the figure, the counting part 160 is composed of a laser element temperature estimating part 178 and an A/D converter 179. The estimating part 178 outputs an estimated laser element temperature signal 180. In the analog circuit of the laser element temperature estimating part 178, charging operations are carried out for a black pixel, and discharging operations are carried out for a white pixel. Therefore, the output analog signal 180 indicates a value corresponding to the present temperature of the laser element. And, the analog signal 180 is converted to a digital signal 182 corresponding to the raw effective light emission pixel number by using an A/D converter 179. Since the counting part 160, which is composed of the above-mentioned analog circuit, can generate a signal 182 corresponding to the raw effective light emission pixel number relevant to the effects of heating and cooling in the laser element which contribute to the temperature increase of the laser element, the composition of the counting part 160 becomes considerably simple, which can provide for reduction in the size of the light beam scanning unit.

Figure 11:
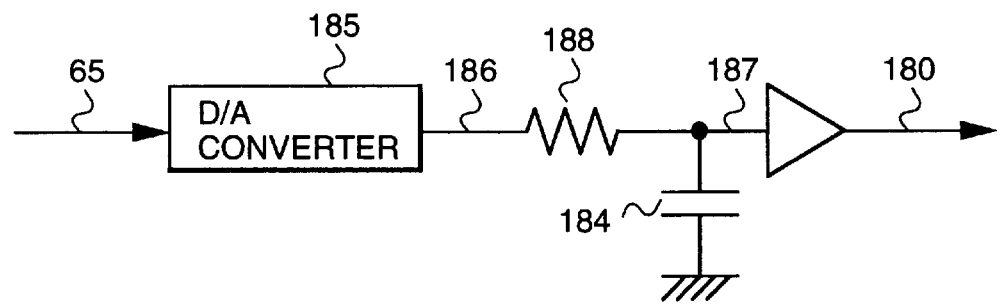
FIG. 11 is a circuit diagram of an effective light emission pixel number counting unit shown in FIG. 10.

FIG. 11 shows a detailed circuit diagram of the laser element estimating part 178 shown in FIG. 10.

In the figure, the picture signal 65 is supplied to an input of the D/A converter 185, which produces an output 186 to a circuit consisting of a resistor 188 and a capacitor 184, which produces a signal 187.

Figure 12A:
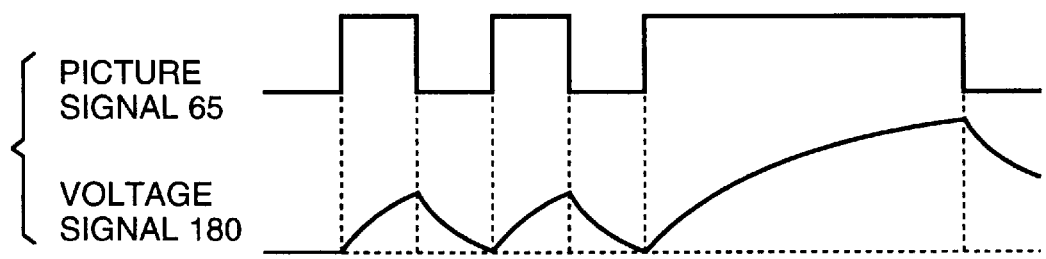
FIGS. 12a and 12b are waveform diagrams showing responses of the parts composing the circuit shown in FIG. 11.
Figure 12B:
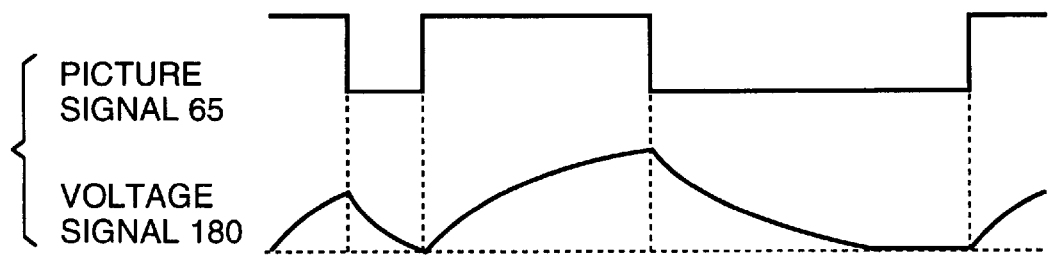

FIGS. 12a and 12b show examples of the output signal 180 compared to the picture signal 65.

By using the light beam scanning apparatus of the present invention, it is possible to change the spot size of a pixel corresponding to the picture information, including a character or an image, with high accuracy, which can realize the printing of a high quality picture of neutral tints.

Furthermore, it is also possible to correct the deviations of the spot size of a scanning beam which are caused by the scattering in the properties of the parts composing the laser element and the apparatus, which improves the reliability of the apparatus.

What is claimed is:

1. A light beam scanning apparatus, comprising:

beam emission means for emitting a laser beam, a spot shape and a laser power of said laser beam being controlled via a commonly used light waveguide part;

beam control means for controlling said beam emission means in accordance with a picture signal containing information on said spot shape and said laser power of said laser beam emitted by said beam emission means;

beam scanning means for scanning a photoconductor with said laser beam and recording information of said picture signal on said photoconductor; and laser power detecting means for detecting said laser power of said laser beam;

wherein said beam control means includes laser control signal correcting means for correcting a laser power control signal to be generated in said beam control means, based on a difference between a laser power required by said picture signal and said laser power detected by said laser power detecting means.

2. A light beam scanning apparatus according to claim 1, wherein said laser power detecting means is arranged in the neighborhood of beam direction changing means of said beam scanning means, between said beam direction changing means and said beam emission means.

3. A light beam scanning apparatus, comprising:

beam emission means for emitting a laser beam, a spot shape and a laser power of said laser beam being controlled via a commonly used light waveguide part;

beam control means for controlling said beam emission means in accordance with a picture signal containing information on said spot shape and said laser power of said laser beam emitted by said beam emission means;

beam scanning means for scanning a photoconductor with said laser beam and recording information of said picture signal on said photoconductor; and laser power and spot shape detecting means for detecting said laser power and said spot shape of said laser beam emitted by said beam emission means;

wherein said beam control means includes laser control signal correcting means for correcting a laser power control signal and a spot shape control signal to be generated in said beam control means, based on a difference between a laser power required by said picture signal and said laser power detected by said laser power and spot shape detecting means, and on a difference between a spot shape required by said picture signal and said spot shape detected by said laser power and spot shape detecting means.

4. A light beam scanning apparatus according to any one of claims 1 to 3, further comprising:

pixel number calculating means for calculating an effective light emission pixel number based on a difference between a number of light emission pixels and a number of non-emission pixels; and temperature detecting means for detecting a temperature at a laser beam emitting part of said beam emission means;

wherein said laser control signal correcting means corrects at least one of said laser power control signal and said spot shape control signal by using at least one of said detected laser power, said detected spot shape, said effective light emission pixel number, and said temperature detected at said laser beam emitting part.

5. A light beam scanning apparatus according to claim 4, wherein said pixel number calculating means includes:

a light emission pixel number counter for counting a number of pixels requiring light emission;

a successive non-emission pixel number counter for counting a number of successive pixels requiring non-emission;

a subtracter for subtracting said successive non-emission pixel number from said light emission pixel number; and a reset signal generating part for generating a signal to reset said light emission pixel number counter and said successive non-emission pixel number counter if the successive non-emission pixel number exceeds a preset number.

6. A light beam scanning apparatus, comprising:

beam emission means for emitting a laser beam, a spot shape and a laser power of said laser beam being controlled via a commonly used light waveguide part;

beam control means for controlling said beam emission means in accordance with a picture signal containing information on said spot shape and said laser power of said laser beam emitted by said beam emission means; and beam scanning means for scanning a photoconductor with said laser beam and recording information of said picture signal on said photoconductor;

wherein said beam control means includes data storing means for storing a data set representing relations between picture signals and pairs of values representing a laser power control signal and a spot shape control signal, said relations being based on operational characteristics peculiar to a laser element used for said beam emission means, and laser power and spot shape control signal generating means for changing said picture signal to a laser power control signal and a spot shape control signal by using said data set in the data storing means and said information, contained in said picture signal, on said spot size and said laser power of said laser beam emitted by said beam emission means; and wherein said laser power and said spot shape of said laser beam emitted by said beam emission means are controlled by said laser power control signal and said spot shape control signal.

7. A light beam scanning apparatus according to claim 6, wherein said data storing means stores a plurality of data sets representing relations between picture signals and pairs of values representing a laser power control signal and a spot shape control signal;

wherein said beam control means includes diagnostic signal generating means for generating a laser power diagnostic signal and a spot shape diagnostic signal for driving laser power control-current outputting means and spot size control-current outputting means so that said beam emission means emits a laser beam having a laser power and a spot shape corresponding to said laser power diagnostic signal and said spot shape diagnostic signal;

wherein said light beam scanning apparatus further comprises:
  laser power and spot shape detecting means for detecting said laser power and said spot shape of said emitted laser beam; and
  data set selecting means for selecting one of said data sets in said data storing means, based on a difference between said detected laser power and said laser power diagnostic signals and on a difference between said detected spot shape and said spot shape diagnostic signal;

wherein said laser power and spot shape control signal generating mean changes said picture signal to a laser power control signal and a spot shape control signal by using said selected data set.

* * * * *